United States Patent [19]

Kawakita

[11] Patent Number: 5,234,255
[45] Date of Patent: Aug. 10, 1993

[54] POWER RECLINING DEVICE FOR SEAT
[75] Inventor: Tadashi Kawakita, Kanagawa, Japan
[73] Assignee: Ikeda Bussan Co., Ltd., Ayase, Japan
[21] Appl. No.: 749,587
[22] Filed: Aug. 26, 1991
[30] Foreign Application Priority Data
  Aug. 29, 1990 [JP] Japan .................................. 2-90149[U]
[51] Int. Cl.$^5$ .................................................. B60N 1/06
[52] U.S. Cl. ................................. 297/354.12; 297/362
[58] Field of Search ................ 297/354, 355, 356, 361, 297/362, 379

[56] References Cited

U.S. PATENT DOCUMENTS

| | | |
|---|---|---|
| 3,099,485 | 7/1963 | Beirbach et al. |
| 3,893,206 | 7/1975 | Pickles et al. |
| 4,195,881 | 4/1980 | Klüting et al. ..................... 297/362 X |
| 4,521,055 | 6/1985 | Fudala ............................... 297/330 X |
| 4,685,735 | 8/1987 | McFalls et al. ...................... 297/362 |
| 4,880,274 | 11/1989 | Ichikawa .............................. 297/362 |
| 4,986,514 | 1/1991 | Ikegaya et al. ....................... 297/362 |

FOREIGN PATENT DOCUMENTS

| | | |
|---|---|---|
| 2660395B1 | 8/1980 | Fed. Rep. of Germany . |
| 3234257A1 | 12/1983 | Fed. Rep. of Germany . |
| 2398636 | 7/1978 | France . |
| 2162890A | 2/1986 | United Kingdom . |

Primary Examiner—Laurie K. Cranmer
Attorney, Agent, or Firm—Foley & Lardner

[57] ABSTRACT

A power reclining device for use in a seat having a seat cushion and a pivotal seatback includes two base plates and two pivoting arms. The base plates are respectively secured to laterally opposed side rear portions of the seat cushion. The pivoting arms are respectively secured to laterally opposed side lower portions of the seatback. The pivoting arms are rotatably connected to the base plates by two rotating shafts, respectively. The base plates, the pivoting arms and the rotating shafts constitute laterally spaced first and second hinge units by which the seatback is permitted to pivot about a common axis of the rotating shafts. A connecting shaft is interposed between and secured to the rotating shafts to constitute a shaft unit. A flat spiral spring is incorporated with the first hinge unit for biasing the pivoting arms to pivot about the common axis in the rearward direction relative to the base plates. The flat spiral spring is positioned between the hinge units and arranged to be disposed about the shaft unit. A spring-supporting bracket is secured to the base plate of the first hinge unit for supporting the spring. An electric motor is operatively connected to the shaft unit for rotating the same when energized.

13 Claims, 3 Drawing Sheets

POWER RECLINING DEVICE FOR SEAT

BACKGROUND OF THE INVENTION

1. Field of the Invention

The present invention relates in general to a reclining device for a seat, and more particularly to a power reclining device for an automotive seat.

2. Description of the Prior Art

Hitherto, various power reclining devices have been proposed and put into practical use.

As is known, the power reclining device is a device for adjusting the angular position of a seatback relative to a seat cushion by the power, for example, of an electric motor to provide a seat occupant with a comfortable sitting posture.

Some of the power reclining devices are of a type which comprises two base plates, two pivoting arms, a flat spiral spring, an electric motor unit and a connecting shaft.

In the power reclining device of this type, the base plates are respectively secured to laterally opposed side rear portions of the seat cushion. The pivoting arms are respectively secured to laterally opposed side lower portions of the seatback. Each pivoting arm is pivotally connected to the corresponding base plate through a rotating shaft. Thus, the base plates and the pivoting arms constitute laterally spaced hinge units. The connecting shaft is secured at its longitudinal opposed ends to the rotating shafts to achieve integral rotation therebetween. The electric motor unit is operatively connected to one of the rotating shafts. A reduction gear mechanism is arranged between each pivoting arm and the corresponding base plate, and engaged operatively with the rotating shaft. By energizing the electric motor unit, both rotating shafts are forced to turn in one direction. With this, each reduction gear mechanism is actuated. Then, the pivoting arms pivot about the rotating shafts and thus rotate the seatback forward or rearward relative to the seat cushion. The flat spiral spring has an inner end secured to the base plate and an outer end secured to the pivoting arm. Therefore, the flat spiral spring biases the seatback rearward or forward relative to the seat cushion. The flat spiral spring is disposed on the outboard side of the hinge unit because the rotating shaft interferes with the flat spiral spring in disposing the flat spiral spring on the inboard side of the hinge unit.

Thus, the flat spiral spring extends outwardly from the hinge unit. Therefore, the power reclining device of this type becomes relatively large in size and may interfere with other vehicular parts in disposing those parts close to the reclining device.

SUMMARY OF THE INVENTION

It is a general object of the present invention to provide a power reclining device which is compact.

According to the present invention, there is provided a power reclining device for use in a seat having a seat cushion and a pivotal seatback, the power reclining device including: a first base plate which is secured to a side rear portion of the seat cushion; a first pivoting arm which is secured to a side lower portion of the seatback; a first rotating shaft by which the first pivoting arm is rotatably connected to the first base plate, so that the first base plate, the first pivoting arm and the first rotating shaft constitute a first hinge unit by which the seatback is permitted to pivot about a first rotational axis of the first rotating shaft; a flat spiral spring for biasing the first pivoting arm to pivot about the first rotational axis in a given direction relative to the first base plate, the flat spiral spring being positioned on the inboard side of the first hinge unit and arranged to be disposed about the first rotating shaft; a spring-supporting bracket secured to the first base plate for supporting the flat spiral spring; and an electric motor for rotating the first rotating shaft when energized.

By virtue of the provision of the flat spiral spring and the spring-supporting bracket, it is made possible to position the flat spiral spring on the inboard side of the first hinge unit.

DESCRIPTION OF THE PREFERRED INVENTION

Referring to FIGS. 1 to 5, there is shown a power reclining device according to the present invention.

Figure 1:
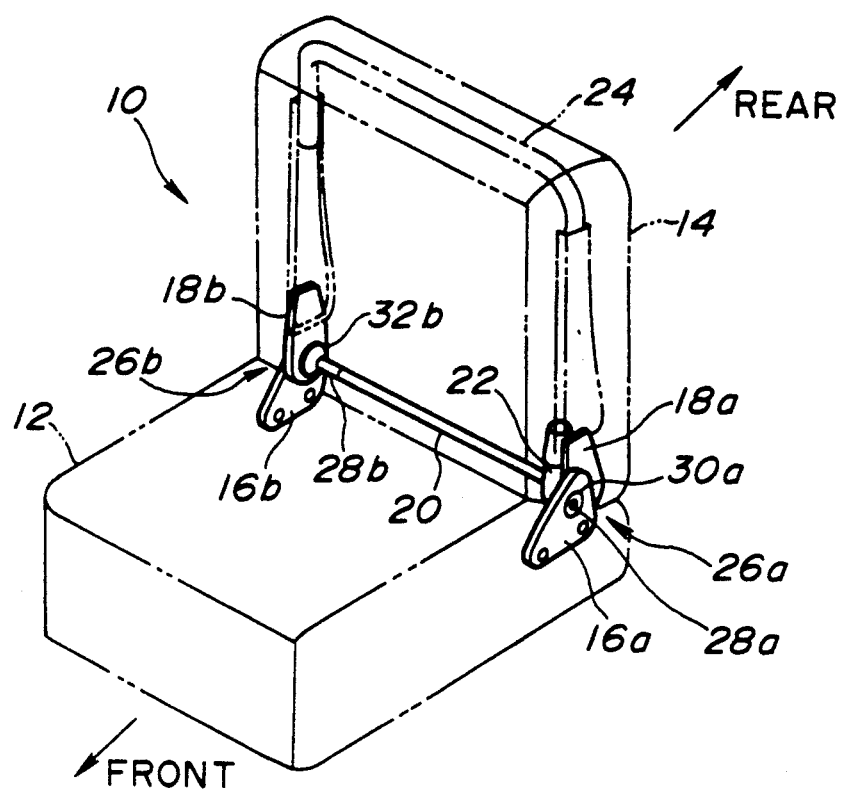
FIG. 1 is a perspective view of a power reclining device of the present invention, showing a condition in which the power reclining device is incorporated with a seatback frame.

As is seen from FIG. 1, the power reclining device is practically mounted on an automotive seat.

The seat 10 comprises a seat cushion 12 and a seatback 14 which is pivotally connected to the seat cushion 12 through the power reclining device. As will become apparent as the description proceeds, the power reclining device rotates the seatback 14 to a desired angular position relative to the seat cushion 12 by electric power.

The power reclining device comprises two base plates 16a and 16b, two pivoting arms 18a and 18b, a connecting shaft 20 and an electric motor unit 22.

The base plates 16a and 16b are respectively secured to laterally opposed side rear portions of a seat cushion frame (not shown) of the seat cushion 12. The pivoting arms 18a and 18b are respectively secured to laterally opposed lower ends of a seatback frame 24 of the seatback 14. These base plates 16a and 16b and pivoting arms 18a and 18b constitute laterally spaced left and right hinge units 26a and 26b. The pivoting arm 18a or 18b of each hinge unit 26a or 26b is connected to the corresponding base plate 16a or 16b so as to be pivotal about a rotating shaft 28a or 28b. Therefore, the seatback 14 is pivotal relative to the seat cushion 12.

Figure 5:
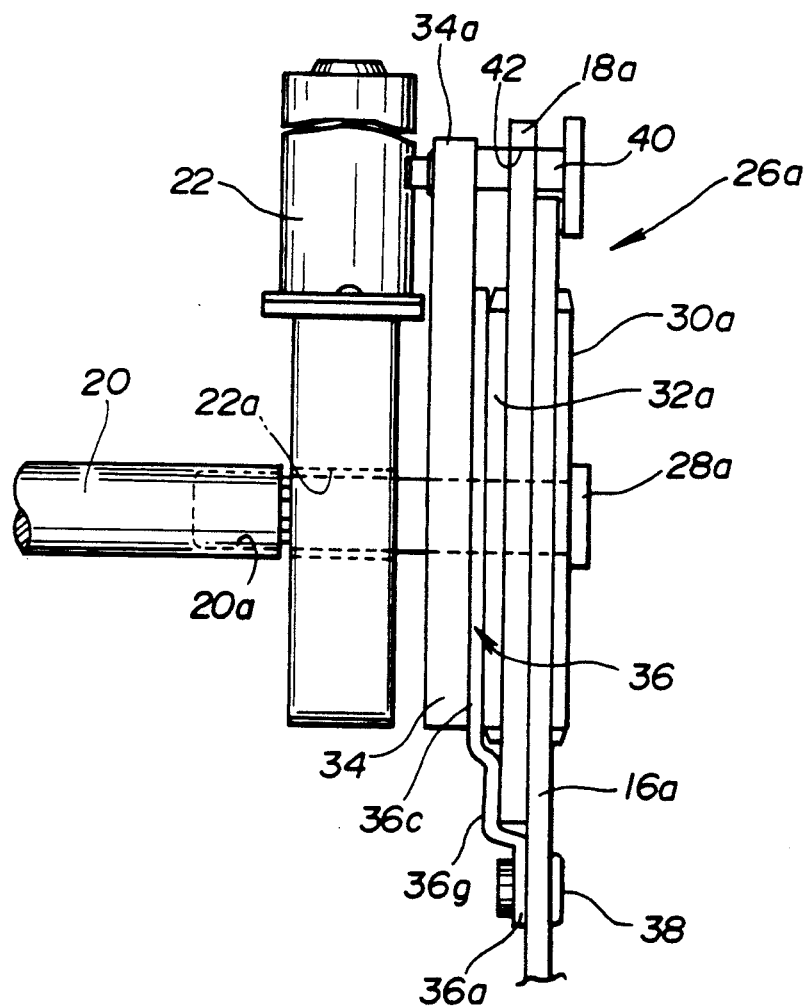
FIG. 5 is a front elevational, but partially cut away view of the power reclining device.

Referring to FIG. 5, each rotating shaft 28a or 28b is rotatably held by the base plate 16a or 16b and the pivoting arm 18a or 18b. Each rotating shaft 28a or 28b is fit at its inner end into a cavity 20a formed at a longitudinal end portion of the connecting shaft 20 to achieve integral and coaxial rotation therebetween.

The electric motor unit 22 is incorporated with one of the hinge units 26a and 26b (left hinge unit in this embodiment). The rotating shaft 28a passes through and is fit into a through hole 22a of the electric motor unit 22. With this, by energizing the electric motor unit 2, both rotating shafts 28a and 28b are integrally coaxially turned in a certain direction.

A known reduction gear mechanism (not shown) such as planetary gears is incorporated between a reduction-gear supporting portion 30a or 30b (only 30a is shown) which protrudes outwardly from the base plate 16a or 16b and a reduction-gear supporting portion 32a or 32b which protrudes inwardly from the pivoting arm 18a or 18b, respectively. Each reduction gear mechanism is operatively connected to the rotating shaft 28a or 28b.

Therefore, when the electric motor unit 22 is energized, both pivoting arms 18a and 18b pivot slowly about the rotating shafts 28a and 28b through the reduction gear mechanisms, respectively. Thus, the seatback 14 pivots slowly in a forward or rearward direction relative to the seat cushion 12.

When the electric motor unit 22 is deenergized, the seatback 14 stops at an angular position. Under this stopped condition, the seatback 14 does not move even when the same is applied with an external force. This is because of the great speed reduction ratio possessed by the reduction gear mechanism. Thus, the seatback 14 is kept at a desired position as long as the electric motor unit 22 is deenergized.

Figure 2:
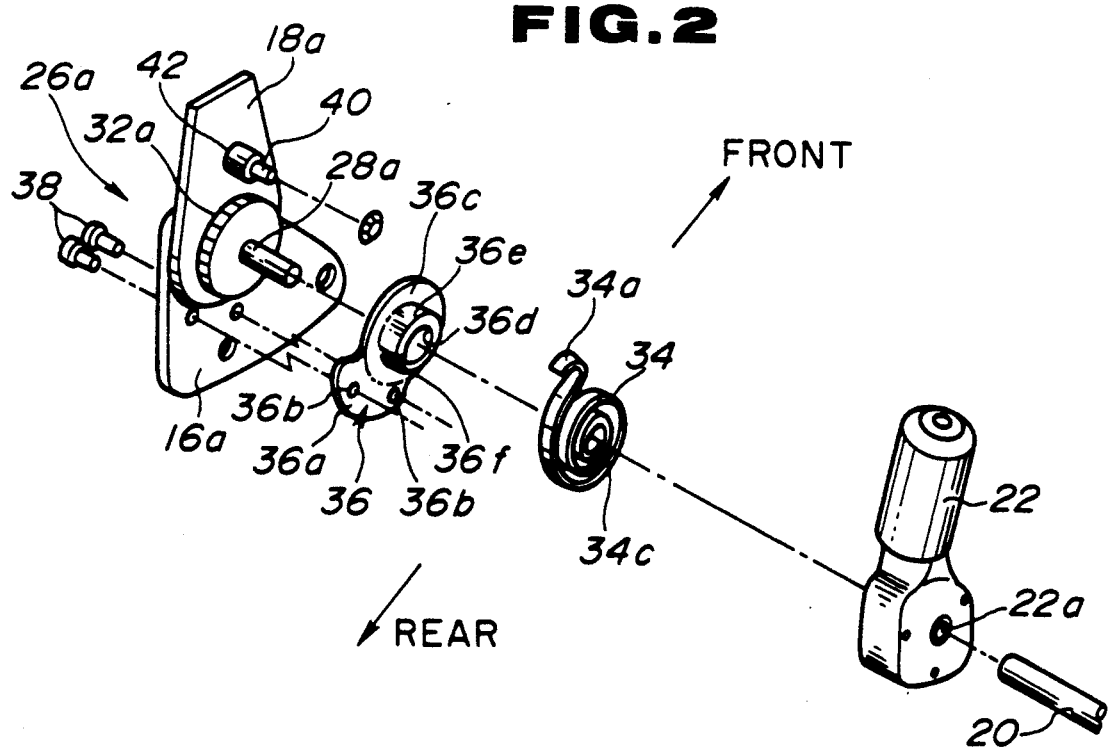
FIG. 2 is an exploded perspective, but partially cut away view of the power reclining device, showing a condition in which the power reclining device is viewed from rear.
Figure 3:
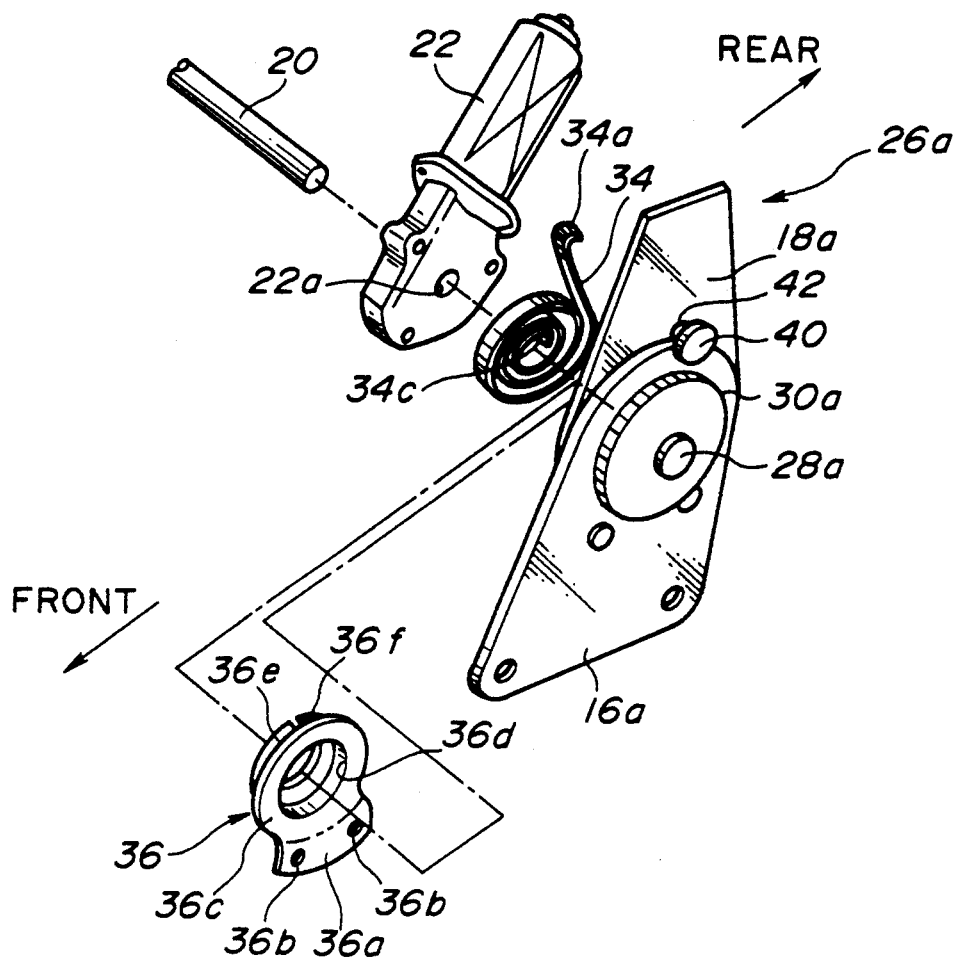
FIG. 3 is a view similar to FIG. 2, but showing a condition in which the power reclining device is viewed from front.

As is seen from FIGS. 2 and 3, a flat spiral spring 34 is incorporated with one of the hinge units 26a and 26b (left hinge unit 26a in this embodiment). However, if desired, two flat spiral springs may be respectively incorporated with the hinge units 26a and 26b. The flat spiral spring 34 has a hook portion 34a formed at its outer end so as to be secured to the pivoting arm 18a.

A spring-supporting bracket 36 has a lower flat portion 36a which has two through holes 36b, an upper circular portion 36c which has at its center a through opening 36d for receiving the rotating shaft 28a therein, and a cylindrical boss portion 36e which extends inwardly from the upper circular portion 36c and has a slot 36f formed therein. The spring-supporting bracket 36 is secured at its lower flat portion 36a to the inner surface of the base plate 16a by common bolts 38. The spring-supporting bracket 36 has a stepped portion 36g between the lower flat portion 36a and the upper circular portion 36c so as to position the upper circular portion 36c to be immediately adjacent to an inner surface of the reduction-gear supporting portion 32a of the pivoting arm 18a (See FIG. 5).

The flat spiral spring 34 is arranged about the cylindrical boss portion 36e of the spring-supporting bracket 36. An inner end portion 34c of the flat spiral spring 34 is received in the slot 36f of the cylindrical boss portion 36e.

The rotating shaft 28a passes through an inner coil portion of the flat spiral spring 34 and the through opening 36d formed in the cylindrical boss portion 36e, in the illustrated manner.

Figure 4:
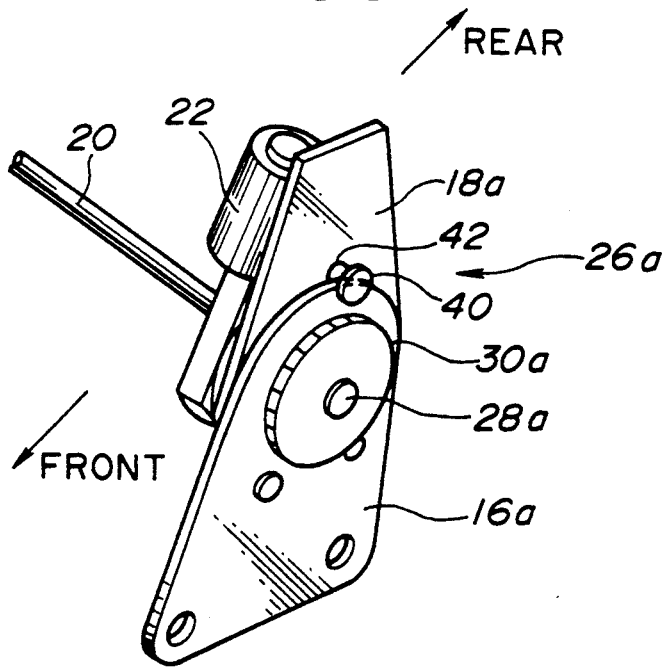
FIG. 4 is a view similar to FIG. 3, but showing a condition in which the power reclining device has been assembled.

As is seen from FIGS. 2, 3 and 4, designated by numeral 40 is a catch which is cylindrical in shape. The catch 40 passes through a through opening 42 of the pivoting arm 18a, which opening 42 is positioned above the top of the base plate 16a. The catch 40 protrudes inwardly from the pivoting arm 18a.

The flat spiral spring 34 is disposed between the electric motor unit 22 and the spring-supporting bracket 36. The hook portion 34a of the flat spiral spring 34 is engaged with the catch 40. The flat spiral spring 34 is so spiraled as to close gaps between successive turns thereof when the seatback 14 pivots forwardly relative to the seat cushion 12. Therefore, the pivoting arms 18a and 18b are biased rearwardly relative to the base plates 16a and 16b, respectively. That is, the seatback 14 is biased rearwardly relative to the seat cushion 12.

The advantages of the power reclining device of the present invention will be described in the following.

Since the flat spiral spring 34 biases the pivoting arm 18a rearwardly in the aforementioned embodiment, the load on the electric motor unit 22 is reduced as compared with a flat spiral spring which biases a pivoting arm forwardly.

Since the flat spiral spring 34 of the present invention is disposed on the inboard side of the hinge unit 26a, the size of the power reclining device is relatively reduced as compared with the aforementioned conventional reclining device.

What is claimed is:

1. A power reclining device for use in a seat having a seat cushion and a pivotal seatback, said power reclining device comprising:

a first base plate which is secured to a side rear portion of said seat cushion;

a first pivoting arm which is secured to a side lower portion of said seatback;

a first rotating shaft by which said first pivoting arm is rotatably connected to said first base plate, so that said first base plate, said first pivoting arm and said first rotating shaft constitute a first hinge unit by which said seatback is permitted to pivot about a first rotational axis of said first rotating shaft;

a flat spiral spring for biasing said first pivoting arm to pivot about said first rotational axis in a given direction relative to said first base plate, said flat spiral spring being positioned on the inboard side of said first hinge unit and arranged to be disposed about said first rotating shaft;

a spring-supporting bracket secured to said first base plate for supporting said flat spiral spring; and an electric motor for rotating said first rotating shaft when energized;

wherein said spring-supporting bracket comprises a lower flat portion secured to an inner surface of said first base plate of said first hinge unit, an upper circular portion which has a through opening formed therein, a cylindrical boss portion which defines said through opening and extends inwardly from said upper circular portion, and a stepped portion which unites said lower flat portion with said upper circular portion so as to position said upper circular portion to be immediately adjacent to said inner surface of said first pivoting arm of said first hinge unit, said cylindrical boss portion having a slot for receiving therein said inner end portion of said flat spiral spring, said through opening being so sized as to receive said first rotating shaft of said first hinge unit.

2. A power reclining device as claimed in claim 1, further comprising a second base plate which is secured to said seat cushion so as to be laterally opposed to said first base plate, a second pivoting arm which is secured to said seatback so as to be laterally opposed to said first pivoting arm, a second rotating shaft by which said second pivoting arm is rotatably connected to said second base plate, said second rotating shaft having a second rotational axis thereof which is aligned with said first rotational axis, so that said second base plate, said second pivoting arm and said second rotating shaft constitute a second hinge unit which is laterally opposed to said first hinge unit.

3. A power reclining device as claimed in claim 2, further comprising a connecting shaft interposed between and secured to said first and second rotating shafts to constitute a shaft unit.

4. A power reclining device as claimed in claim 3, in which said connecting shaft is coaxially interposed between said first and second rotating shafts.

5. A power reclining device as claimed in claim 2, in which said first and second pivoting arms are respectively disposed on the inboard sides of said first and second base plates, respectively.

6. A power reclining device as claimed in claim 1, in which said flat spiral spring has an outer end portion thereof secured to said first pivoting arm of said first hinge unit and an inner end portion thereof secured to said spring-supporting bracket.

7. A power reclining device as claimed in claim 6, in which said outer end portion of said flat spiral spring is rearwardly bent and engaged with a cylindrical projection of said first pivoting arm of said first hinge unit which projection protrudes inwardly from an inner surface of said first pivoting arm of said first hinge unit, and in which said flat spiral spring is so spiraled as to close gaps between successive turns thereof when said seatback pivots forwardly about said first and second rotational axes of said first and second rotating shafts.

8. A power reclining device as claimed in claim 1, in which said flat spiral spring is arranged about said cylindrical boss portion of said spring-supporting bracket.

9. A power reclining device as claimed in claim 1, in which said electric motor has a through hole which is so sized as to tightly receive therein said first rotating shaft of said first hinge unit, such that said first rotating shaft of said first hinge unit is turned in a certain direction by energizing said electric motor, and in which said electric motor is disposed on the inboard side of said flat spiral spring.

10. A power reclining device for use in a seat having a seat cushion and a pivotal seatback, said power reclining device comprising:
 a first base plate which is secured to a side rear portion of said seat cushion;
 a second base plate;
 a first pivoting arm which is secured to a side lower portion of said seatback;
 a second pivoting arm rotatably connected to said second base plate;
 a first rotating shaft by which said first pivoting arm is rotatably connected to said first base plate, so that said first base plate, said first pivoting arm and said first rotating shaft constitute a first hinge unit by which said seatback is permitted to pivot about a first rotational axis of said first rotating shaft;
 a flat spiral spring for biasing said first pivoting arm to pivot about said first rotational axis in a given direction relative to said first base plate, said flat spiral spring being positioned on the inboard side of said first hinge unit and arranged to be disposed about said first rotating shaft, said flat spiral spring having an outer end portion thereof secured to said first pivoting arm of said first hinge unit and an inner end portion;
 a spring-supporting bracket being secured to said first base plate for supporting said flat spiral spring and being secured to said inner end portion of said flat spiral spring; and
 an electric motor for rotating said first rotating shaft when energized;
 wherein said outer end portion of said flat spiral spring is rearwardly bent and engaged with a cylindrical projection of said first pivoting arm of said first hinge unit, said projection protrudes inwardly from an inner surface of said first pivoting arm of said first hinge unit, and said flat spiral spring is so spiraled as to close gaps between successive turns thereof when said seatback pivots forwardly about said first and second rotational axes of said first and second rotating shafts;
 wherein said first and second pivoting arms are respectively disposed on the inboard sides of said first and second base plates;
 wherein said spring-supporting bracket comprises a lower flat portion secured to an inner surface of said first base plate of said first hinge unit, an upper circular portion which has a through opening formed therein, a cylindrical boss portion which defines said through opening and extends inwardly from said upper circular portion, and a stepped portion which unites said lower flat portion with said upper circular portion so as to position said upper circular portion to be immediately adjacent to said inner surface of said first pivoting arm of said first hinge unit, said cylindrical boss portion having a slot for receiving therein said inner end portion of said flat spiral spring, said through opening being so sized as to receive said first rotating shaft of said first hinge unit.

11. A power reclining device as claimed in claim 10, wherein said flat spiral spring is arranged about said cylindrical boss portion of said spring-supporting bracket.

12. A power reclining device as claimed in claim 10, wherein said electric motor has a through hole which is so sized as to tightly receive therein said first rotating shaft of said first hinge unit, such that said first rotating shaft of said first hinge unit is turned in a certain direction by energizing said electric motor, and said electric motor is disposed on the inboard side of said flat spiral spring.

13. A power reclining device for use in a seat having a seat cushion and a pivotal seatback, said power reclining device comprising:
 a first base plate which is secured to a side rear portion of said seat cushion;
 a first pivoting arm which is secured to a side lower portion of said seatback;
 a first rotating shaft by which said first pivoting arm is rotatably connected to said first base plate, so that said first base plate, said first pivoting arm and said first rotating shaft constitute a first hinge unit by which said seatback is permitted to pivot about a first rotational axis of said first rotating shaft;
 a flat spiral spring for biasing said first pivoting arm to pivot about said first rotational axis in a given direction relative to said first base plate, said flat spiral spring being positioned on the inboard side of said first hinge unit and arranged to be disposed about said first rotating shaft;

a spring-supporting bracket secured to said first base plate for supporting said flat spiral spring; and an electric motor for rotating said first rotating shaft when energized;

wherein said spring-supporting bracket comprises a lower flat portion which is directly secured to an inner surface of said first base plate of the first hinge unit, an upper portion which has a through opening which is so sized as to receive said rotating shaft of the first hinge unit, and a stepped portion which unites the lower flat portion with the upper portion so as to interpose a portion of said first pivoting arm between a portion of said first base plate and said upper portion of said spring-supporting bracket.

* * * * *